United States Patent
Jang et al.

(10) Patent No.: US 9,668,296 B2
(45) Date of Patent: *May 30, 2017

(54) METHOD OF CONTROLLING CONNECTION BETWEEN NODES IN DIGITAL INTERFACE

(71) Applicant: LG ELECTRONICS INC., Seoul (KR)

(72) Inventors: Chang Hwan Jang, Kyonggi-do (KR); Jae Yoon Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/265,100

(22) Filed: Sep. 14, 2016

(65) Prior Publication Data

US 2017/0006660 A1    Jan. 5, 2017

Related U.S. Application Data

(63) Continuation of application No. 14/600,435, filed on Jan. 20, 2015, now Pat. No. 9,615,396, which is a (Continued)

(30) Foreign Application Priority Data

Aug. 23, 1999   (KR) .............................. 10-1999-35030

(51) Int. Cl.
*H04W 4/00* (2009.01)
*H04W 76/06* (2009.01)
(Continued)

(52) U.S. Cl.
CPC ..... *H04W 76/064* (2013.01); *H04L 12/40058* (2013.01); *H04L 12/40065* (2013.01);
(Continued)

(58) Field of Classification Search
USPC ........................ 370/236–341, 419–463, 395; 709/224–241
See application file for complete search history.

(56) References Cited

U.S. PATENT DOCUMENTS 4,972,355 A    11/1990 Mullins
5,329,308 A    7/1994 Binns et al.
(Continued)

FOREIGN PATENT DOCUMENTS

JP       10-327173 A      12/1998
WO    WO 98/43391 A1    10/1998

OTHER PUBLICATIONS

U.S. Appl. No. 14/600,435, filed Jan. 20, 2015.
U.S. Appl. No. 15/265,027, filed Sep. 14, 2016.
U.S. Appl. No. 15/265,075, filed Sep. 14, 2016.

*Primary Examiner* — Man Phan
(74) *Attorney, Agent, or Firm* — Birch, Stewart, Kolasch & Birch, LLP

(57) ABSTRACT

A method and a digital device for controlling a connection between a plurality of nodes through an interface are discussed. The method according to an embodiment includes receiving control information including identification information of a destination node and a disconnection command. During a disconnection state according to the disconnection command, the connection between the plurality of nodes is released, and the plurality of nodes maintain the disconnection state until a new connection command is detected. During the disconnection state, a physical connection between the plurality of nodes is maintained to receive the new connection command through the interface. The method further includes transmitting, according to the control information, response information including identification information of a source node.

8 Claims, 2 Drawing Sheets

| Opcode | PIP CONNECTION(0x28) |
|---|---|
| operand[0] | Subfunction |
| operand[1] | Connection |
| operand[2] | Bandwidth |
| operand[3] | Source Node_ID |
| operand[4] | |
| operand[5] | Source Channel Number |
| operand[6] | Output PCR Number |
| operand[7] | Destination Node_ID |
| operand[8] | |
| operand[9] | Destination Channel Number |
| operand[10] | Input PCR Number |

Related U.S. Application Data continuation of application No. 14/282,776, filed on May 20, 2014, now Pat. No. 8,976,755, which is a continuation of application No. 13/943,967, filed on Jul. 17, 2013, now Pat. No. 8,817,812, which is a continuation of application No. 13/034,981, filed on Feb. 25, 2011, now Pat. No. 8,594,124, which is a continuation of application No. 11/833,540, filed on Aug. 3, 2007, now Pat. No. 7,899,021, which is a continuation of application No. 11/451,444, filed on Jun. 13, 2006, now Pat. No. 7,289,482, which is a continuation of application No. 09/644,301, filed on Aug. 23, 2000, now Pat. No. 7,068,674.

(51) Int. Cl.

| | | |
|---|---|---|
| *H04L 12/40* | (2006.01) | |
| *H04N 5/44* | (2011.01) | |
| *H04L 12/24* | (2006.01) | |
| *H04L 29/06* | (2006.01) | |
| *H04N 21/436* | (2011.01) | |
| *H04N 21/4363* | (2011.01) | |
| *H04W 72/04* | (2009.01) | |
| *H04W 76/02* | (2009.01) | |
| *H04L 12/741* | (2013.01) | |
| *H04N 21/41* | (2011.01) | |

(52) U.S. Cl.
CPC .......... *H04L 41/0823* (2013.01); *H04L 45/74* (2013.01); *H04L 65/1069* (2013.01); *H04L 69/22* (2013.01); *H04N 5/4401* (2013.01); *H04N 21/43615* (2013.01); *H04N 21/43632* (2013.01); *H04W 72/042* (2013.01); *H04W 72/0406* (2013.01); *H04W 76/021* (2013.01); *H04W 76/028* (2013.01); *H04W 76/06* (2013.01); *H04N 21/4108* (2013.01)

(56) References Cited

U.S. PATENT DOCUMENTS

| | | | |
|---|---|---|---|
| 5,467,348 A | 11/1995 | Fujii et al. | |
| 5,481,542 A | 1/1996 | Logston et al. | |
| 5,574,973 A | 11/1996 | Borth et al. | |
| 5,671,216 A | 9/1997 | Subasingha et al. | |
| 5,671,225 A | 9/1997 | Hooper et al. | |
| 5,680,399 A | 10/1997 | Totzke et al. | |
| 5,710,972 A | 1/1998 | Lin | |
| 5,825,752 A | 10/1998 | Fujimori et al. | |
| 5,842,127 A | 11/1998 | Pashtan et al. | |
| 5,862,482 A | 1/1999 | Beesley | |
| 5,883,621 A | 3/1999 | Iwamura | |
| 5,905,522 A | 5/1999 | Lawler | |
| 5,963,557 A | 10/1999 | Eng | |
| 6,073,197 A | 6/2000 | Stewart | |
| 6,240,553 B1 | 5/2001 | Son et al. | |
| 6,243,707 B1 | 6/2001 | Humpleman et al. | |
| 6,381,697 B1* | 4/2002 | Kawamura | G11B 15/026 |
| | | | 380/240 |
| 6,389,496 B1 | 5/2002 | Matsuda | |
| 6,434,117 B1 | 8/2002 | Momona | |
| 6,452,935 B1 | 9/2002 | Gibbs | |
| 6,470,029 B1 | 10/2002 | Shimizu | |
| 6,487,408 B1 | 11/2002 | Tokuyoshi | |
| 6,493,552 B1 | 12/2002 | Hicks | |
| 6,522,660 B1 | 2/2003 | Mukaihara et al. | |
| 6,539,450 B1 | 3/2003 | James et al. | |
| 6,563,809 B1 | 5/2003 | Proctor, Jr. et al. | |
| 6,567,664 B1 | 5/2003 | Bergenwall et al. | |
| 6,629,173 B2* | 9/2003 | Iijima | H04L 12/40 |
| | | | 370/443 |
| 6,643,258 B1 | 11/2003 | Ise et al. | |
| 6,665,020 B1 | 12/2003 | Stahl et al. | |
| 6,678,769 B1* | 1/2004 | Hatae | H04L 12/40052 |
| | | | 710/105 |
| 6,690,648 B2* | 2/2004 | Niida | H04L 12/40052 |
| | | | 370/236 |
| 6,704,932 B1* | 3/2004 | Matsunaga | H04L 12/44 |
| | | | 348/E7.071 |
| 6,751,687 B1 | 6/2004 | Sato et al. | |
| 6,757,765 B1 | 6/2004 | Fukushima et al. | |
| 6,788,653 B1 | 9/2004 | Sakamoto et al. | |
| 6,804,250 B2* | 10/2004 | Hatae | H04L 12/40052 |
| | | | 370/419 |
| 6,842,814 B1 | 1/2005 | Kim et al. | |
| 6,885,631 B1 | 4/2005 | Kim et al. | |
| 6,904,033 B1 | 6/2005 | Perras et al. | |
| 6,947,422 B1 | 9/2005 | Ichimura et al. | |
| 6,950,408 B1 | 9/2005 | Domon et al. | |
| 6,993,606 B1 | 1/2006 | Takaku et al. | |
| 7,002,964 B1* | 2/2006 | Ohnishi | H04L 12/40071 |
| | | | 370/384 |
| 7,003,606 B2* | 2/2006 | Fukushima | H04L 12/403 |
| | | | 348/E5.006 |
| 7,016,303 B1 | 3/2006 | Sakamoto et al. | |
| 7,042,896 B1 | 5/2006 | Kim et al. | |
| 7,058,746 B1 | 6/2006 | Kaibuki | |
| 7,123,621 B1* | 10/2006 | Niida | H04L 12/64 |
| | | | 370/395.5 |
| 7,145,872 B1 | 12/2006 | Kim | |
| 7,187,655 B1 | 3/2007 | Sato et al. | |
| 7,590,133 B2* | 9/2009 | Hatae | H04L 47/10 |
| | | | 370/412 |
| 8,594,124 B2 | 11/2013 | Jang et al. | |
| 2003/0172201 A1 | 9/2003 | Hatae et al. | |
| 2007/0291726 A1 | 12/2007 | Jang et al. | |

* cited by examiner

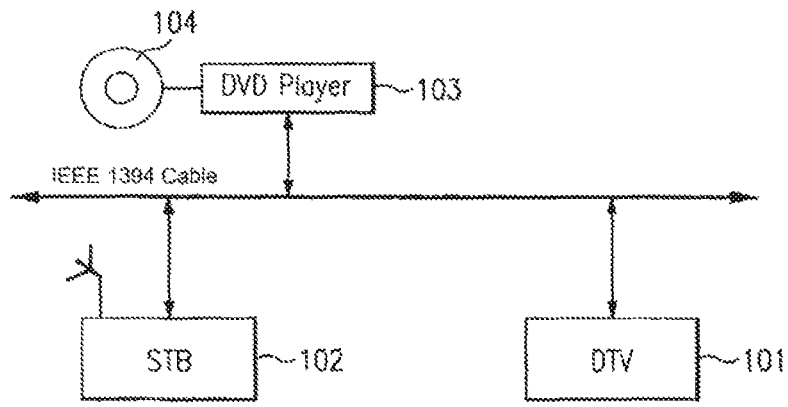

METHOD OF CONTROLLING CONNECTION BETWEEN NODES IN DIGITAL INTERFACE

CROSS-REFERENCE TO RELATED APPLICATIONS

This Application is a Continuation of co-pending U.S. patent application Ser. No. 14/600,435 filed on Jan. 20, 2015, which is a Continuation of U.S. patent application Ser. No. 14/282,776 filed on May 20, 2014 (now U.S. Pat. No. 8,976,755 issued on Mar. 10, 2015), which is a Continuation of U.S. patent application Ser. No. 13/943,967 filed on Jul. 17, 2013 (now U.S. Pat. No. 8,817,812 issued on Aug. 26, 2014), which is a Continuation of U.S. patent application Ser. No. 13/034,981 filed on Feb. 25, 2011 (now U.S. Pat. No. 8,594,124 issued on Nov. 26, 2013), which is a Continuation of U.S. patent application Ser. No. 11/833,540 filed on Aug. 3, 2007 (now U.S. Pat. No. 7,899,021 issued on Mar. 1, 2011), which is a Continuation of U.S. patent application Ser. No. 11/451,444 filed on Jun. 13, 2006 (now U.S. Pat. No. 7,289,482 issued on Oct. 30, 2007), which is a Continuation of U.S. patent application Ser. No. 09/644,301 filed on Aug. 23, 2000 (now U.S. Pat. No. 7,068,674 issued on Jun. 27, 2006), which claims the benefit under 35 U.S.C. §119(a) to Korean Patent Application No. 10-1999-35030 filed on Aug. 23, 1999, all of which are hereby expressly incorporated by reference into the present application.

BACKGROUND OF THE INVENTION

Field of the Invention

The present invention relates generally to a digital interface, and more particularly to a method of controlling connection between nodes in a digital interface.

Discussion of the Related Art

FIG. 1 illustrates a connection state of a conventional 1394 system connected between nodes. Referring to FIG. 1, the conventional digital interface includes first and second input plug control registers 21 and 22 for inputting/outputting connection information between nodes connected to a 1394 serial bus 10 in accordance with control signals of an application node (not illustrated), a first audio/video node 20 comprising a first input master plug register 23, a third input plug control register 31 for inputting/outputting connection information between nodes connected to the 1394 serial bus 10 in accordance with control signals of the application node, a second audio/video node 30 comprising a second input master plug register 32, a fourth input plug control register 41 for inputting/outputting connection information between nodes connected to the 1394 serial bus 10 in accordance with control signals of the application node, a third video/audio node 40 comprising a third input master plug register 42, fifth and sixth plug control registers 51 and 52 for inputting/outputting connection information between nodes connected to the 1394 serial bus 10 in accordance with control signals of the application node, a fourth audio/video node 50 comprising a fourth input master plug register 53, an output plug control register 61 for inputting/outputting connection information between nodes connected to the 1394 serial bus 10 in accordance with control signals of the application node, and a fifth audio/video node 60 comprising an output master plug register 62.

The method of controlling connection between nodes for the conventional digital interface as constructed above will be explained in detail with reference to accompanying drawings.

The application node is allocated with a channel for transmitting isochronous data from the fifth audio/video node 60 to the first audio/video node 20 through a point-to-point connection or broadcast connection, and writes in the same format the output plug control register in the fifth audio/video node 60 and the input plug control register in the first audio/video node 20 in the output plug control register 61 and the second input plug control register 22.

Thereafter, the application node writes "1" in an on-line bit of the output plug control register 61 in the fifth audio/video node 60 and an on-line bit of the second input plug control register 22 to transmit the isochronous data.

Also, the application node writes in the same format the output plug control register in a point-to-point connection counter or a broadcast connection counter of the output plug control register 61 in the fifth audio/video node 60.

Then, the isochronous data is transmitted from the fifth audio/video node 60 to the first audio/video node 20 through the channel.

Thus, transmission of the isochronous data from the fifth audio/video node 60 to the second and fourth audio/video nodes 30 and 40 is performed through the above-described process.

According to the conventional method of controlling connection between nodes in a digital interface, however, since no command for connection the nodes to the digital interface is provided, the transmission/reception, reproduction and control of a data stream of a predetermined program cannot be smoothly performed.

SUMMARY OF THE INVENTION

Accordingly, the present invention is directed to a method of controlling connection between nodes in a digital interface that substantially obviates one or more of the problems due to limitations and disadvantages of the related art.

An object of the present invention is to provide a method of controlling connection between nodes in a digital interface whereby a first node that is a master node determines a second node as a master, and a point-to-point connection or a broadcast connection to another third node is controlled through the second node.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the method of controlling connection between nodes in a digital interface comprises the steps of a first node that is a master having a display device determining a second node to be a master in accordance with a user selection and transmitting a connection command of a predetermined format for transmitting a data stream, and the second node determined as the master in accordance with the transmitted connection command of the predetermined format being allocated with a channel and a bandwidth from an isochronous resource manager (IRM), performing a point-to-point connection between the second node and the first node, and transmitting the data stream.

The connection command of the predetermined format may be composed of a subfunction region representing whether the connection is the point-to-point connection or a broadcast connection, a connection region representing whether to make or cut off the connection, a source node identification (ID) region representing a source node ID of the node which transmits the data stream, and a destination node ID region representing a destination node ID of the node which receives the data stream.

The subfunction region may be set to the broadcast connection from the second node to the first node or another node to enable the transmission of the data stream.

At the data stream transmitting step, the second node may transmit a response of a predetermined format which corresponds to the connection command of the predetermined format to the first node.

The format of the response may be the same as the format of the connection command.

The format of the response may further include a bandwidth region representing a bandwidth allocated from the source node, a source channel number region representing a source channel number allocated from the source node, an output plug control register number region representing an output plug control register (PCR) number of the source node, a destination channel number region representing a destination channel number of the destination node for receiving the data stream, and an input PCR number region representing an input PCR number of the destination node.

According to another aspect of the present invention, the first node that is the master having the display device determines the second node to be the master in accordance with the user selection to perform the point-to-point connection to a third node, and transmits the connection command of the predetermined format for transmitting the data stream. The second node is allocated with the channel and the bandwidth from the isochronous resource manager (IRM), and then performs the point-to-point connection between the second node itself and the third node to enable transmission of the data stream.

According to another aspect of the invention, the first node having the display device determines the second node to be the master in accordance with the user selection, and transmits the connection command of the predetermined format for transmitting the data stream to a third node, and the second node is allocated with the channel and the bandwidth from the IRM, and then performs the point-to-point connection between the second node itself and to the third node to enable transmission of the data stream.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 2 is a block diagram illustrating the construction of a system to which the method of controlling connection between nodes in a digital interface according to an embodiment of the present invention is applied.

FIGS. 3A and 3B are views illustrating a connection command form according to the method of controlling connection between nodes in a digital interface according to an embodiment of the present invention.

DETAILED DESCRIPTION OF THE EMBODIMENTS

Figure 1:
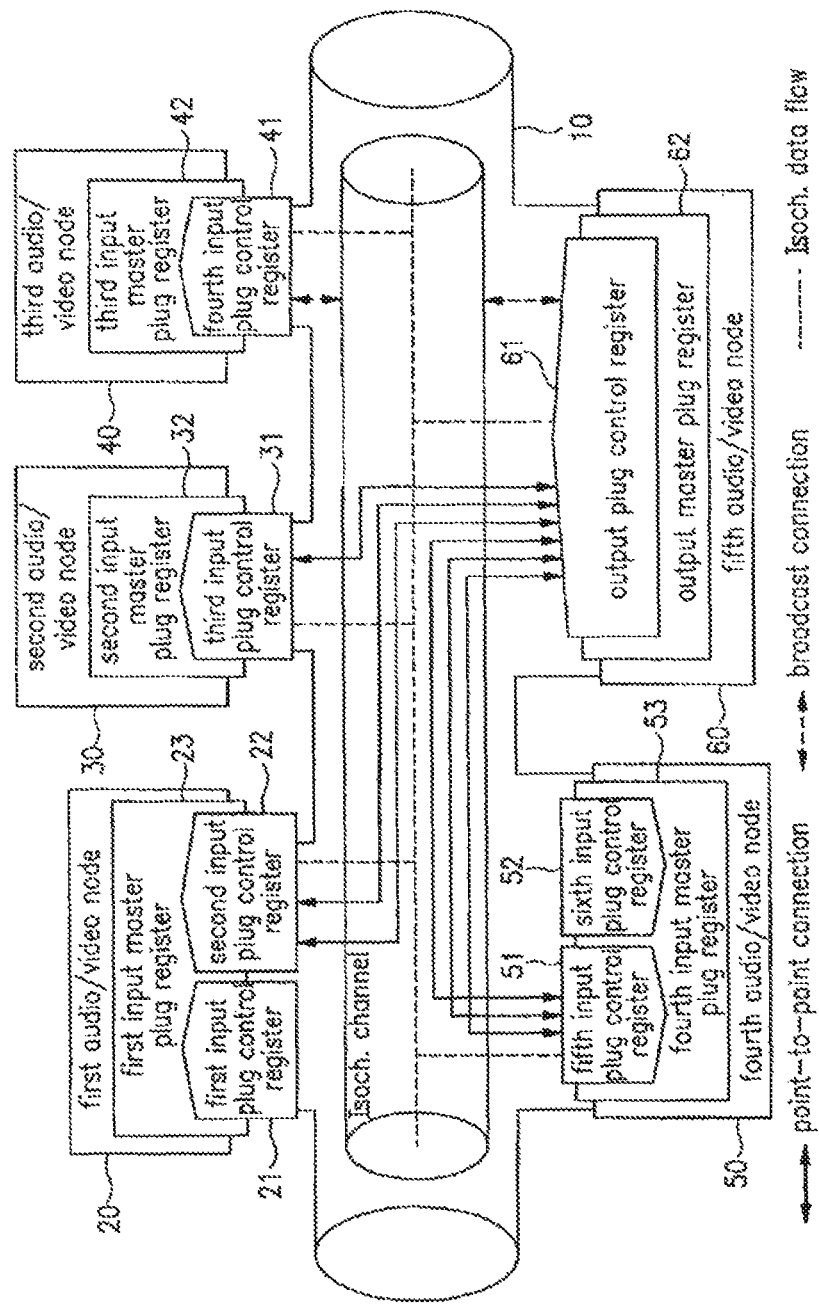
FIG. 1 is a view illustrating a connection state of a conventional 1394 system connected between nodes.

Reference will now be made in detail to the method of controlling connection between nodes in a digital interface according to a preferred embodiment of the present invention, examples of which are illustrated in the accompanying drawings.

FIG. 2 is a block diagram illustrating the construction of a system to which the method of controlling connection between nodes in a digital interface according to an embodiment of the present invention is applied. The system comprises a digital television (DTV) 101, a set-top box (STB) 102, and a digital video disk (DVD) player 103, and a disk 104.

FIGS. 3A and 3B are views illustrating a connection command form according to the method of controlling connection between nodes in a digital interface according to an embodiment of the present invention. As shown in FIG. 3A, the connection command is composed of a subfunction region representing whether the connection is a point-to-point connection or a broadcast connection, a connection region representing whether to make or cut off the connection, a source node identification (ID) region representing a source node ID of the node which transmits a data stream, and a destination node ID region representing a destination node ID of the node which receives the data stream, a bandwidth region representing a bandwidth allocated from the source node, a source channel number region representing a source channel number allocated from the source node, an output plug control register number region representing an output plug control register (PCR) number of the source node, a destination channel number region representing a destination channel number of the destination node for receiving the data stream, and an input PCR number region representing an input PCR number of the destination node. The subfunction region in FIG. 3A is illustrated in detail in FIG. 3B.

The method of controlling connection between nodes in a digital interface as constructed above will be explained in detail with reference to the accompanying drawings.

First, if a user selects the DTV 101 or the STB 102 which are displayed on a screen in order to view a specified program received in the STB 102 through an IEEE 1394 cable as shown in FIG. 2, the DTV 101 transmits the connection command of a predetermined format as shown in FIGS. 3A and 3B to the STB 102 with the STB 102 determined as a master to transmit the data stream.

Specifically, before transmitting the connection command to the STB 102, the DTV 101 writes "0x01" in the subfunction region of the connection command as shown in FIGS. 3A and 3B to record the point-to-point connection, "0x00" in the connection region to record making of the connection, the node ID of the STB 102 in the source node ID region, and its own ID in the destination node ID region, respectively.

The node IDs of the nodes displayed on the screen are connected to the IEEE 1394 cable, and are stored in the DTV 101 when the power is turned on or the bus is reset.

Then, the STB 102 transmits a response corresponding to the connection command to the DTV 101 in accordance with the connection command transmitted from the DTV 101.

Here, the STB 102 may transmit a command identical to the connection command as the response.

Also, before transmitting the connection command to the DTV 101 as the response, the STB 102 may additionally write the bandwidth allocated from the isochronous resource manager in the bandwidth region, the channel number allocated from the isochronous resource manager in the source channel number region, its own output plug control register (PCR) number in the output PCR number region, the allocated channel number in the destination channel number region, and the input PCR number of the DTV 101 in the input PCR number region, respectively.

Thereafter, the STB 102 is allocated with the channel and bandwidth from the isochronous resource manager (not illustrated), sets its own output plug control register and the input plug control register of the DTV 101 for the point-to-point connection as shown in FIG. 1, and then transmits the data stream of the program to the DTV 101 to display the data stream on the screen.

Here, the DTV 101 writes "0x10", which means the broadcast connection, in the subfunction region of the connection command, and transmits the connection command, so that the data stream of the program can be broadcast from the STB 102 to not only the DTV 101 itself but also other nodes connected to the IEEE 1394 cable.

If the display is completed, the DIV 101 transmits the connection command to the STB 102 after writing "0x01" in the subfunction region of the connection command to record the point-to-point connection, "0x10" in the connection region to record cut-off of the connection, the node ID of the STB 102 in the source node ID region, and its own node ID in the destination node ID region, so that the point-to-point connection or the broadcast connection can be released.

Also, if a user selects the DVD player 103 among the DTV 101, STB 102, and DVD player 103 displayed on the screen as shown in FIG. 2 to store the data stream of the program being viewed in the disk 104, the DTV 101 transmits the connection command of a predetermined format as shown in FIGS. 3A and 3B to the DVD player 103 with the DVD player 103 determined as a master to store the data stream.

Specifically, before transmitting the connection command to the DVD player 103, the DTV 101 writes "0x01" in the subfunction region of the connection command as shown in FIGS. 3A and 3B to record the point-to-point connection, "0x00" in the connection region to record the making of the connection, the node ID of the DTV 101 in the source node ID region, and the node ID of the DVD player 103 in the destination node ID region, respectively.

The node IDs of the nodes displayed on the screen are connected to the IEEE 1394 cable, and stored in the DTV 101 when the power is turned on or the bus is reset.

Then, the DVD player 103 transmits a response corresponding to the connection command to the DIV 101 in accordance with the connection command transmitted from the DTV 101.

Here, the DVD player 103 may transmit a command identical to the connection command as the response.

Also, before transmitting the connection command to the DTV 101 as the response, the DVD player 103 may additionally write the bandwidth allocated from the isochronous resource manager in the bandwidth region, the channel number allocated from the isochronous resource manager in the source channel number region, the output plug control register (PCR) number of the DTV 101 in the output PCR number region, the channel number allocated from the isochronous resource manager in the destination channel number region, and its own input PCR number in the input PCR number region, respectively.

Thereafter, the DVD player 103 is allocated with the channel and bandwidth from the isochronous resource manager (not illustrated), sets its own input plug control register and the output plug control register of the DTV 101 for the point-to-point connection as shown in FIG. 1, and then receives the data stream outputted from the DTV 101 to store the data stream in the disk 104.

Here, the DTV 101 writes "0x10", which means the broadcast connection, in the subfunction region of the connection command, and transmits the connection command, so that the data stream of the program being viewed can be broadcast from itself to not only the DVD player 103 but also other nodes connected to the IEEE 1394 cable.

If the display is completed, the DTV 101 transmits the connection command to the DVD player 103 after writing "0x01" in the subfunction region of the connection command to record the point-to-point connection, "0x10" in the connection region to record cut-off of the connection, the node ID of the DTV 101 in the source node ID region, and the node ID of the DVD player 103 in the destination node ID region, so that the point-to-point connection or the broadcast connection can be released.

Also, if a user selects the STB 102 among the DTV 101, STB 102, and DVD player 103 displayed on the screen as shown in FIG. 2 to store the data stream of the program being received from the STB 102 through the IEEE 1394 cable in the disk 104, the DTV 101 transmits the connection command of a predetermined format as shown in FIGS. 3A and 3B to the STB 102 with the STB 102 determined as a master to store the data stream.

Specifically, before transmitting the connection command to the STB 102, the DIV 101 writes "0x01" in the subfunction region of the connection command as shown in FIGS. 3A and 3B to record the point-to-point connection, "0x00" in the connection region to record the making of the connection, the node ID of the STB 102 in the source node ID region, and the node ID of the DVD player 103 in the destination node ID region, respectively.

The node IDs of the nodes displayed on the screen are connected to the IEEE 1394 cable, and stored in the DTV 101 when the power is turned on or the bus is reset.

Then, the STB 102 transmits a response corresponding to the connection command to the DTV 101 in accordance with the connection command transmitted from the DTV 101.

Here, the STB 102 may transmit a command identical to the connection command as the response.

Also, before transmitting the connection command to the DTV 101 as the response, the STB 102 may additionally write the bandwidth allocated from the isochronous resource manager in the bandwidth region, the channel number allocated from the isochronous resource manager in the source channel number region, its own output plug control register (PCR) number in the output PCR number region, the allocated channel number in the destination channel number region, and the input PCR number of the DVD player 103 in the input PCR number region, respectively.

Thereafter, the STB 102 is allocated with the channel and bandwidth from the isochronous resource manager (not illustrated), sets its own output plug control register and the input plug control register of the DVD player 103 for the point-to-point connection as shown in FIG. 1, and then transmits the received data stream to the DVD player 103.

Then, the DVD player 103 stores in the disk 104 the data stream of the program transmitted from the STB 102 through the point-to-point connection.

Here, the DTV 101 writes "0x10", which means the broadcast connection, in the subfunction region of the connection command, and transmits the connection command, so that the data stream of the program received from the STB 102 is not only stored in the disk 104 through the DVD player 103 but also broadcast to other nodes connected to the IEEE 1394 cable.

If the display is completed, the DTV 101 transmits the connection command to the STB 102 after writing "0x01" in the subfunction region of the connection command to record the point-to-point connection, "0x10" in the connection region to record cut-off of the connection, the node ID of the STB 102 in the source node ID region, and the node ID of the DVD player 103 in the destination node ID region, so that the point-to-point connection or the broadcast connection can be released.

Meanwhile, if a user selects the DVD player 103 among the DTV 101, STB 102, and DVD player 103 displayed on the screen as shown in FIG. 2 to reproduce through the DVD player 103 and view through the DTV 101 the data stream of the program stored in the disk 104, the DTV 101 transmits the connection command of a predetermined format as shown in FIGS. 3A and 3B to the DVD player 103 with the DVD player 103 determined as a master to reproduce the data stream of the program stored in the disk 104 and transmit the data stream to the DTV 101 itself.

Specifically, before transmitting the connection command to the DVD player 103, the DTV 101 writes "0x01" in the subfunction region of the connection command as shown in FIGS. 3A and 3B to record the point-to-point connection, "0x00" in the connection region to record the making of the connection, the node ID of the DVD player 103 in the source node ID region, and its own node ID in the destination node ID region, respectively.

The node IDs of the nodes displayed on the screen are connected to the IEEE 1394 cable, and stored in the DTV 101 when the power is turned on or the bus is reset.

Then, the DVD player 103 transmits a response corresponding to the connection command to the DTV 101 in accordance with the connection command transmitted from the DTV 101.

Here, the DVD player 103 may transmit a command identical to the connection command as the response.

Also, before transmitting the connection command to the DTV 101 as the response, the DVD player 103 may additionally write the bandwidth allocated from the isochronous resource manager in the bandwidth region, the channel number allocated from the isochronous resource manager in the source channel number region, its own output plug control register (PCR) number in the output PCR number region, the allocated channel number in the destination channel number region, and the input PCR number of the DTV 101 in the input PCR number region, respectively.

Thereafter, the DVD player 103 is allocated with the channel and bandwidth from the isochronous resource manager, sets its own output plug control register and the input plug control register of the DTV 101 for the point-to-point connection as shown in FIG. 1, and then reproduces the data stream of the program stored in the disk 104 to transmit the reproduced data stream to the DTV 101.

Then, the DTV 101 displays on the screen the data stream of the program transmitted from the DVD player 103 through the point-to-point connection.

Here, the DTV 101 writes "0x10", which means the broadcast connection, in the subfunction region of the connection command, and transmits the connection command, so that the data stream of the program being reproduced and transmitted from the DVD player 103 can be not only displayed on the screen but also broadcast to other players connected to the IEEE 1394 cable.

If the display is completed, the DTV 101 transmits the connection command to the DVD player 103 after writing "0x01" in the subfunction region of the connection command to record the point-to-point connection, "0x10" in the connection region to record cut-off of the connection, the node ID of the DVD player 103 in the source node ID region, and its own node ID in the destination node ID region, so that the point-to-point connection or the broadcast connection can be released.

As described above, according to the method of controlling connection between nodes in a digital interface, one node among nodes connected to the digital interface, that is a master, determines another node to be the master, and controls a point-to-point connection or a broadcast connection among the nodes, so that the transmission/reception, reproduction, and control of the data stream of a certain program can be smoothly performed.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method for controlling a connection between a plurality of nodes through an interface, the method comprising:
   receiving control information including identification information of a destination node and a disconnection command,
   wherein the disconnection command represents that a connection between the plurality of nodes is released,
   wherein the plurality of nodes maintain a disconnection state until a new connection command is detected, and
   wherein during the disconnection state, a physical connection between the plurality of nodes is maintained to receive the new connection command through the interface; and
   transmitting, according to the control information, response information including identification information of a source node.

2. The method of claim 1, wherein the identification information of each of the destination and source nodes is a unique node identifier.

3. The method of claim 1, wherein the control information and the response information are preformatted.

4. The method of claim 1, wherein the destination node is at least one of a digital versatile disc (DVD) player, a digital television (DTV), or a set-top box (STB).

5. A digital device for controlling a connection between a plurality of nodes through an interface, the digital device comprising:
   a receiver configured to receive control information including identification information of a destination node and a disconnection command,
   wherein the disconnection command represents that a connection between the plurality of nodes is released,
   wherein the plurality of nodes maintain a disconnection state until a new connection command is detected, and wherein during the disconnection state, a physical connection between the plurality of nodes is maintained to receive the new connection command through the interface; and a transmitter configured to transmit, according to the control information, response information including identification information of a source node.

6. The digital device of claim 5, wherein the identification information of each of the destination and source nodes is a unique physical node identifier.

7. The digital device of claim 5, wherein the control information and the response information are preformatted.

8. The digital device of claim 5, wherein the destination node is at least one of a digital versatile disc (DVD) player, a digital television (DTV), or a set-top box (STB).

* * * * *